United States Patent
Balmer et al.

(10) Patent No.: US 10,041,620 B2
(45) Date of Patent: Aug. 7, 2018

(54) LINE ASSEMBLY

(71) Applicant: Witzenmann GmbH, Pforzheim (DE)

(72) Inventors: Bert Balmer, Pforzheim (DE); Jorg Ludwig, Pforzheim (DE); Rene Rosler, Karlsruhe (DE); Daniel Rothfuss, Straubenhardt (DE); Bernd Seeger, Pforzheim (DE)

(73) Assignee: Witzenmann GmbH, Pforzheim (DE)

( * ) Notice: Subject to any disclaimer, the term of this patent is extended or adjusted under 35 U.S.C. 154(b) by 0 days.

(21) Appl. No.: 15/319,278

(22) PCT Filed: May 22, 2015

(86) PCT No.: PCT/EP2015/061411
§ 371 (c)(1),
(2) Date: Dec. 15, 2016

(87) PCT Pub. No.: WO2016/005096
PCT Pub. Date: Jan. 14, 2016

(65) Prior Publication Data
US 2017/0146175 A1 May 25, 2017

(30) Foreign Application Priority Data

Jul. 10, 2014 (DE) .................. 10 2014 109 667
Jul. 10, 2014 (DE) .................. 10 2014 109 668

(51) Int. Cl.
*F16L 9/14* (2006.01)
*F16L 55/04* (2006.01)
(Continued)

(52) U.S. Cl.
CPC ........ *F16L 55/041* (2013.01); *F01N 13/1816* (2013.01); *F16L 11/15* (2013.01);
(Continued)

(58) Field of Classification Search
CPC .... F16L 7/00; F16L 11/20; F16L 11/15; F16L 59/141; F16L 59/125; F16L 59/153
(Continued)

(56) References Cited

U.S. PATENT DOCUMENTS 2,875,987 A * 3/1959 La Valley ............... F28F 9/013
108/125
3,110,324 A 11/1963 De Haan
(Continued)

FOREIGN PATENT DOCUMENTS

DE 8225704 12/1982
DE 102010037162 3/2011
(Continued)

*Primary Examiner* — Patrick F Brinson
(74) *Attorney, Agent, or Firm* — Volpe and Koenig, P.C.

(57) ABSTRACT

Proposed is a line assembly (1), including: a metal hose (2) that is corrugated at least in some segments; and an inner component (3), which is arranged radially inside the metal hose at least over a partial length of the metal hose; the line assembly being distinguished by at least one coupling element (4, 4'), which coupling element is arranged between an outer border (2d) of the metal hose (2) and an outside surface (3a) of the inner component (3) and which coupling element is designed to damp the metal hose (2) by means of mechanical coupling to the inner component (3).

20 Claims, 7 Drawing Sheets

(51) Int. Cl.
  *F16L 11/15* (2006.01)
  *F16L 27/10* (2006.01)
  *F16L 27/111* (2006.01)
  *F16L 51/02* (2006.01)
  *F01N 13/18* (2010.01)
(52) U.S. Cl.
  CPC ......... *F16L 27/1004* (2013.01); *F16L 27/111* (2013.01); *F16L 51/025* (2013.01); *F16L 51/026* (2013.01)
(58) Field of Classification Search
  USPC .......................................... 138/112–114, 148
  See application file for complete search history.

(56) References Cited

U.S. PATENT DOCUMENTS

| | | | | |
|---|---|---|---|---|
| 3,332,446 | A * | 7/1967 | Mann | F16L 59/125 138/114 |
| 3,490,496 | A * | 1/1970 | Stearns | F16L 9/18 138/112 |
| 4,130,904 | A * | 12/1978 | Whalen | A61F 2/06 138/122 |
| 5,803,127 | A | 9/1998 | Rains | |
| 6,234,163 | B1 * | 5/2001 | Garrod | F16L 11/20 126/307 R |
| 6,840,284 | B2 * | 1/2005 | Schippl | F16L 59/141 138/112 |
| 6,848,478 | B2 * | 2/2005 | Nagai | F01N 13/1816 138/112 |
| 7,748,749 | B2 * | 7/2010 | Baumhoff | F01N 13/1816 138/121 |
| 8,291,940 | B2 * | 10/2012 | Frohne | F16L 7/00 138/112 |
| 8,453,680 | B2 * | 6/2013 | Weiss | F01N 13/16 138/113 |
| 2011/0209790 | A1 | 9/2011 | Weiss et al. | |
| 2013/0015652 | A1 | 1/2013 | Thomas et al. | |
| 2014/0311612 | A1 * | 10/2014 | Hoglund | B01J 8/067 138/114 |

FOREIGN PATENT DOCUMENTS

| | | |
|---|---|---|
| DE | 102013111033 | 4/2014 |
| EP | 1010872 | 6/2000 |

* cited by examiner

LINE ASSEMBLY

BACKGROUND

The invention relates to a line assembly having: a metal hose, which is corrugated at least segmentally, and an inner component, which is arranged radially inside of the metal hose, at least over a partial length of the metal hose.

Line assemblies of the type defined at the outset are used in exhaust systems of motor vehicles, for example. Here, the metal hose ensures a desired mechanical flexibility, in particular for decoupling of vibration, while the inner component ensures a defined guidance of flow within the metal hose and furthermore also assumes a thermal insulation function.

To damp vibrations that occur in the line assembly, it has been proposed in the past to cover the metal hose externally with an outer component in the form of an external knitted fabric, but this entails additional outlay in assembly and in terms of costs. Moreover, there is frictional wear due to friction between the external knitted fabric and the metal hose. It is not possible to set the achievable damping effect precisely; on the contrary, there is a certain unwanted scatter in the damping due to the external knitted fabric. It has furthermore been found that the damping properties of the external knitted fabric are not constant over the service life of the line assembly. Moreover, the external knitted fabric is subject to weathering/corrosion due to its external arrangement. Finally, it has also proven disadvantageous that, in fastening the external knitted fabric and deflecting force therein, there is usually a need for a preliminary corrugation with a reduced outside diameter, and this is associated with corresponding additional requirements on the metal hose.

The intention is to overcome this large number of inherent disadvantages by creating a novel line assembly which leads to good and sustained damping of the metal hose without using an external knitted fabric and at the same time significantly reduces the assembly effort and the costs which arise.

SUMMARY

According to the invention, the object is achieved by a line assembly having one or more features of the invention. Preferred developments of the line assembly according to the invention are defined in the dependent claims.

A line assembly according to the invention comprises a metal hose, which is corrugated at least segmentally, and an inner component, which is arranged radially inside of the metal hose, at least over a partial length of the metal hose; it is characterized by at least one coupling element, which coupling element is arranged between an outer border of the metal hose and an outer surface of the inner component and which coupling element is designed to damp the metal hose by means of mechanical coupling to the inner component.

For this purpose, the at least one coupling element preferably makes contact with an outer border of the metal hose, on the one hand, and with the outer surface of the inner component, on the other hand, at least during the operation of the line assembly.

In the context of this description, the term "outer border" describes in general a region of the corrugated metal hose, which region is arranged radially to the outside of the region of the smallest clear inside diameter of the metal hose, wherein the last-mentioned region is also referred to as the inner border. In the region of the coupling point, that is to say where the coupling element makes contact with the metal hose, the metal hose can be shaped differently than in regions with "normal corrugations". Shaping of the metal hose or of the corrugation in the region of the coupling point in a manner that matches the requirements of the coupling element is thus explicitly within the scope of the invention. It is, in particular, the contacting of the metal hose in the region of an outer border (or of a lateral flank included therein) at a distance from the inner border of the metal hose that ensures an increase in service life since it is precisely the inner border of the metal hose which is subject to particularly high loads, e.g. due to thermal stress. Previously known solutions, in which corresponding spacing elements are provided between the inner component and the inner border of the metal hose must be regarded as disadvantageous in this respect.

According to the invention, therefore, the damping of the metal hose, which can be designed as a bellows, is accomplished by means of the internal friction of the inner component, which can advantageously be a strip wound hose or liner, by connecting the internal component (liner) and the metal hose (bellows). In this way, it is possible, in particular, to eliminate the external knitted fabric and to prevent the occurrence of frictional wear on the outer border of the metal hose.

In this context, it is also possible to envisage that—apart from the at least one coupling element—there is no physical contact between the inner component and the metal hose, thereby making it possible to avoid frictional wear in this region. Due to the fact that the frictional wear is thus lower, it is even possible, in the case of a multi-layer embodiment of the metal hose, to dispense with at least one hose layer or to reduce the overall wall thickness of the hose.

By virtue of the avoidance of contact, as mentioned, between the inner component and the metal hose, the occurrence of rattling noises is prevented in an effective manner without the need for an additional and expensive knitted fabric around the inner component (knitted fabric around the liner) for this purpose. Overall, a significant cost reduction is obtained in all cases.

As a development of the subject matter according to the invention, the at least one coupling element can be arranged at a particular axial position along the line assembly between the inner surface of the metal hose and an outer surface of the inner component in order, in a very selective way, to damp the formation of certain vibrations of the metal hose or of the line assembly overall by mechanical coupling to the inner component. Depending on the positioning of the coupling element or of the coupling elements between the metal hose and the inner component, it is possible to prevent the formation of all relevant vibration modes.

For this purpose, at least one coupling element is, for example, positioned in a particular corrugation of the metal hose and, in this position, projects into the clear width of the metal hose, thus making contact with said hose in the region of the outer border. In this case, the inserted inner component likewise comes into contact with the coupling element.

In this way, it is possible, on the one hand, to damp the metal hose very selectively at certain points in order to selectively influence the vibration behavior. On the other hand, it is possible to place the remaining flexible length of the inner component, which is situated between corresponding contact points with coupling elements, in a region of the line assembly which is subject to particularly high loads.

The coupling elements do not have to be made of metal but can also comprise a material with better thermal insulation in order to prevent heat transfer from the inside to the outside, which is a particular advantage especially in the case of exhaust gas applications.

As part of a first development of the line assembly according to the invention, provision can be made for the at least one coupling element to be arranged substantially at the location or at least in the vicinity of a vibration anti-node of an undamped vibration mode of the metal hose or of the overall assembly comprising the metal hose and the inner component.

In addition, however, provision can be made for a plurality of coupling elements to be provided at different positions along the line assembly in order to suppress substantially all relevant vibration modes, this already having been referred to above.

It is furthermore possible to provide for subdivision of the metal hose into two or more, preferably unequal, hose modules or hose segments, in particular hose modules or hose segments of different lengths, to be achieved by arranging a plurality of coupling elements at different positions along the line assembly. Moreover, the subdivision of the metal hose can be chosen in such a way that the vibrations of the hose modules or hose segments influence one another, preferably destructively, due to phase displacement, in order to exert a positive effect overall on the vibration behavior.

As part of yet another development of the line assembly according to the invention, provision can be made for the position of the at least one coupling element to be matched to the natural form or form of vibration or vibration mode of the metal hose (associated with a given vibration natural frequency) in order to selectively damp vibrations. The at least one coupling element is preferably arranged substantially at the location or in the vicinity of a vibration anti-node of an undamped vibration mode of the metal hose or of the overall assembly comprising the metal hose and the inner component.

Another development of the line assembly according to the invention envisages that the coupling element is designed for engagement in profile gaps of the inner component and, at the same time, is preferably matched to a pitch of said profile gaps. Such an embodiment can be appropriate, in particular, if the inner component is designed as a strip wound hose, e.g. as a hook-in or double-interlock liner.

If the coupling element engages in said profile gaps of the inner component, it is furthermore possible, for assembly purposes, to position the coupling element or the inner component relative to the metal hose by screwing in, which makes possible particularly accurate axial relative positioning and, associated with this, selective damping of the metal hose.

As part of yet another embodiment of the line assembly according to the invention, provision can be made for the coupling element to touch the metal hose and/or the inner component at a number of contact points over the circumference. These contact points can be designed as contact points that are distinct over the circumference. As an alternative, however, it is also possible for the coupling element to touch the metal hose and/or the inner component substantially over an extended area around the entire circumference.

In the region of the contact points, the metal hose can be designed in a way which differs from its embodiment in other areas, in particular its "normally corrugated" embodiment, to which reference has already been made in connection with the term "outer border".

In order to avoid damage and wear, yet another development of the line assembly according to the invention envisages that the coupling element is designed to be rounded or to be bent round at the contact points.

Another advantageous development of the line assembly according to the invention envisages that the coupling element is designed as an element which extends substantially over at least the full circumference of the inner component and/or of the metal hose. As an alternative, however, provision can also be made for the coupling element to be designed as an element which extends over part of the circumference of the inner component and/or of the metal hose. Here, a plurality of such coupling elements can be arranged in a manner distributed over the full circumference of the inner component and/or of the metal hose. In between, there can be gaps, or said coupling elements can overlap at least in pairs.

Yet another development of the line assembly according to the invention envisages that the coupling element is designed as a geometrical structure with at least a single interruption or is designed to be deformable in some other way. This enables the coupling element to be inserted through the clear width of the metal hose in the region of an inner border of said hose and then expanded into the region of an outer border of said hose, resulting in easier assembly.

In principle, the coupling element can be designed as a flexible sheet-metal part, in particular a sheet-metal part which can be expanded radially. As an alternative, however, embodiment of the coupling element as a piece of wire, in particular a springy piece of wire, is also possible.

The coupling element can have thickened portions, projections or a material thickness which is/are larger than half the outer border width of the outer border (in the axial direction of the corrugated hose) during the operation of the line assembly, that is to say also during deformations thereof. This prevents individual coupling elements distributed over the circumference from sliding past one another, blocking each other and thus preventing the intended damping effect.

Yet another development of the line assembly according to the invention envisages that a material thickness of the coupling element is less than or equal to a width of profile gaps of the inner component. In this way, the coupling element can engage in said profile gaps of the inner component, especially if the latter is designed as a hook-in or double-interlock liner, thus allowing selective axial positioning of the coupling element to be achieved.

Yet another development of the line assembly according to the invention envisages that the at least one coupling element is held with a clamping action between the outer border of the metal hose and the inner component. This results in reliable and sustained contact, and the intended damping effect is ensured.

As an alternative or in addition, provision can be made for the at least one coupling element to be connected materially, preferably by welding, at the contact points thereof with the metal hose and/or with the inner component.

It has already been mentioned that the at least one coupling element can have selective axial positioning relative to the metal hose for the purpose of damping certain vibrations of the line assembly. More specifically, the at least one coupling element can, for this purpose, be arranged substantially at the location or in the vicinity of a vibration anti-node of an undamped vibration mode of the metal hose or of the overall assembly comprising the metal hose and the inner component.

Finally, another embodiment of the line assembly according to the invention is distinguished by the fact that the metal hose and the inner component are relatively spaced apart, with the exception of any attachment points in the end-located connection regions of the line assembly and/or with the exception of the position of the at least one coupling element, in particular in accordance with the above-described selective axial positioning, in order to avoid contact and wear if possible.

Advantages that can be achieved by means of the invention and the developments thereof relate to the local fixing of the inner component as well as the use of the internal friction of the inner component to damp the external metal hose, thereby making it possible to eliminate external knitted fabrics and possibly even one hose layer or to reduce the overall wall thickness thereof. The possible embodiments of the coupling element which have been presented avoid the use of wire press rings, which often lead to problems with the achievable technical cleanliness. Since no external knitted fabrics are used, it is possible, in particular, to use a continuously corrugated bellows without preliminary corrugations or the like as a metal hose, and this, in turn, means a cost saving. Through selective positioning of the at least one coupling element, the dynamic behavior of the line assembly can be selectively adjusted, depending on the embodiment of the metal hose or bellows.

By virtue of the fact that the coupling element preferably engages in the outer corrugation of the metal hose (outer border), the coupling contact is shifted away from the metal hose's inner border, which is already subject to high loads in any case, and this can significantly increase the service life of the assembly.

By virtue of the small contact surfaces between the coupling element and the metal hose or inner component, as envisaged in the context of embodiments of the present invention, the heat transferred by thermal bridges is reduced, thereby reducing heat losses, and this is advantageous especially in the case of an exhaust gas application. Moreover, reduced frictional wear occurs.

BRIEF DESCRIPTION OF THE DRAWINGS

Further advantages and characteristics of the invention will become apparent from the following description of illustrative embodiments with reference to the drawing, in which.

DETAILED DESCRIPTION OF THE PREFERRED EMBODIMENTS

Figure 1:
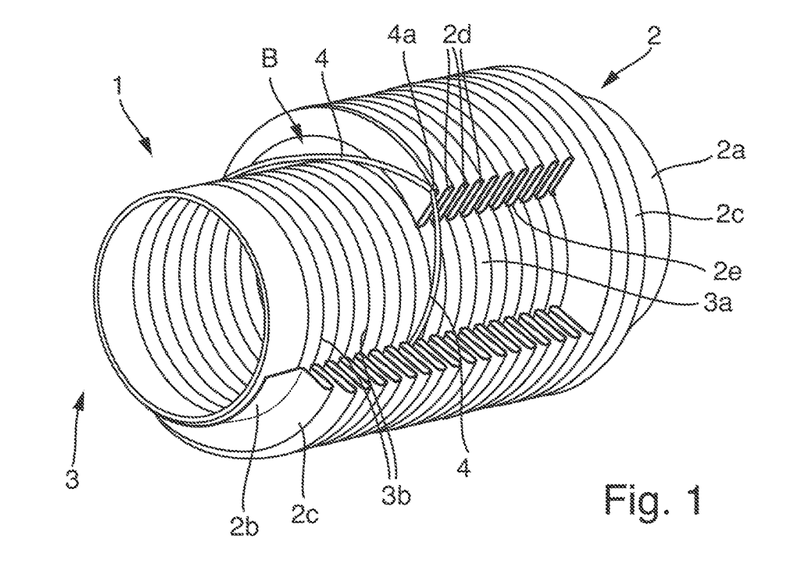
FIG. 1 shows, partially cut away, a first embodiment of the line assembly according to the invention having a metal bellows and a strip wound hose, which is arranged as an inner component within the metal bellows, together with a number of coupling elements.

FIG. 1 shows, in a perspective view, a—partially cut away—line assembly according to the invention, which is denoted overall by the reference sign 1. The line assembly 1 comprises an at least segmentally corrugated metal hose 2, which, in the present case, is designed as a metal bellows with smooth-cylindrical end-located connection regions 2a, 2b. Adjacent to the connection regions 2a, 2b, the metal bellows (or bellows for short) 2 in each case has a preliminary corrugation 2c of reduced corrugation height. In the context of the present invention, however, this feature is not necessarily formed and is thus merely optional.

Arranged radially inside of the bellows 2 is an inner component 3, which extends at least over a partial length of the bellows 2, in the present case over the entire length thereof. In the present case, the inner component 3 is designed as a strip wound hose or liner, e.g. with a hook-in or double-interlock profile, although the invention is not restricted to such a specific embodiment of the inner component 3.

Arranged between the metal bellows 2 and the inner component 3 are a number of coupling elements 4, which coupling elements 4 are arranged between an outer border 2d of the bellows and an outer surface 3a of the inner component 3. The coupling elements 4 are designed and correspondingly arranged to establish a physical connection between the inner component 3 and the bellows 2 and thus to damp the bellows 2 by mechanical coupling with the inner component 3, which has an internal friction.

It is important here that the coupling elements 4 make contact with the bellows 2 in the region of the outer border 2d on the inside of said bellows—not in the region of an inner border, denoted by way of example by reference sign 2e in FIG. 1, which is subject, in particular, to higher thermal loads.

According to the illustration in FIG. 1, the coupling elements 4 are designed substantially in the manner of simple wire segments which make point contact with the bellows 2 by means of their (rounded) ends 4a. By means of a sufficient thickness of the wire in relation to the clear width of the bellows 2 in the region of the outer border 2d, it is ensured that mutually abutting coupling elements 4 cannot slide past one another in an undefined manner. In particular, provision can be made for the thickness of the material of the coupling elements 4 to be greater than half the width (of the outer border) of the bellows 2 in the region of the outer borders 2d. In addition or as an alternative, end-located thickened portions, projections or the like can be provided on the coupling elements 4 in said region in order to prevent undefined slippage of the coupling elements 4.

In the region between their ends 4a, the coupling elements 4 rest on the outside of the inner component 3 in a region B in order in this way to produce damping mechanical coupling between the inner component 3 and the bellows 2. The intention here can be—not just in the embodiment according to FIG. 1—for the coupling elements 4 to engage selectively in profile gaps 3b of the inner component 3, especially if the inner component 3 is a strip wound hose, having a hook-in or double-interlock profile, for example.

By virtue of the mechanical coupling between the damping inner component 3 and the bellows 2, which is achieved by means of the coupling elements 4, it is possible in principle to dispense entirely with additional damping of the line assembly 1 by a knitted metal fabric arranged conventionally outside the bellows 2. This fundamentally also eliminates the end sleeves that are generally present for fastening the knitted fabric in the region of the connection ends 2a, 2b. The elimination of the knitted fabric also makes it possible to dispense with the already mentioned preliminary corrugation 2c of the bellows 2, which is provided according to the prior art for defined deflection of the knitted fabric.

The following FIGS. 2 to 13 show alternative embodiments of the coupling elements 4, which do not have to be present as a plurality, but the function of which can also be achieved by a single coupling element.

Provision can furthermore be made to provide said coupling elements 4 not only at a single axial position along the line assembly 1 but selectively at a plurality of positions for damping particular vibration modes of the line assembly 1. More precise details of this will be given below with reference to FIG. 14.

Figure 2:
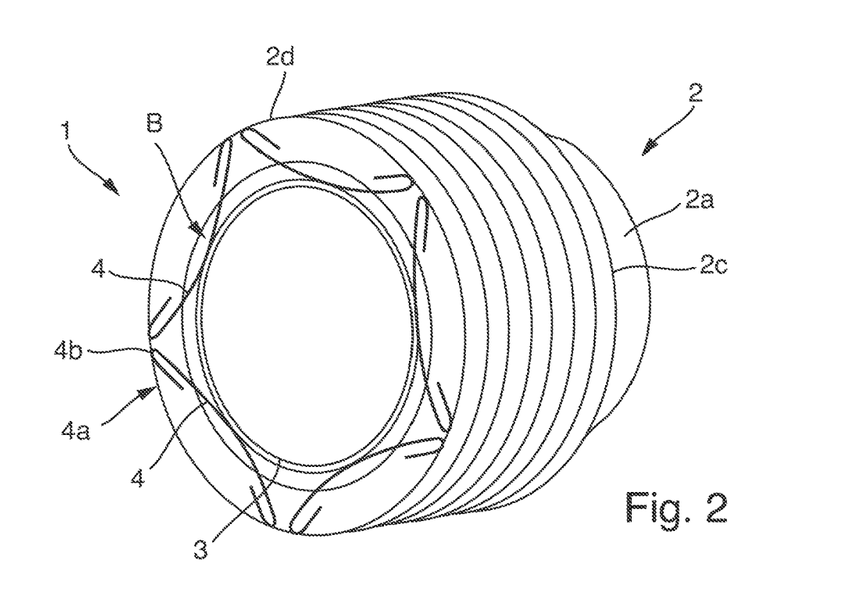
FIG. 2 shows a line assembly substantially corresponding to FIG. 1 having coupling elements designed in an alternative way.

Unlike FIG. 1, the coupling elements 4 according to FIG. 2 do not have a convex curvature corresponding to the bellows 2 but have a concave curvature. At their ends 4a, the coupling elements 4 have 180° bends in order to form the already mentioned rounded portions. By means of the rounded ends 4a, the coupling elements 4 once again make contact in the region of an outer border 2d of the bellows, while they make contact with the inner component 3 in region B and thus ensure the intended mechanical coupling or damping of the bellows 2.

According to FIG. 2, five coupling elements 4 are arranged substantially without gaps over the circumference of the bellows 2. However, the invention is in no way restricted to such a number and/or arrangement. It is also possible, according to FIG. 2, to use a suitable material thickness of the coupling elements 4 to ensure that these cannot slide past one another in the circumferential direction. As an alternative or in addition, it is also possible to design the coupling elements 4 with suitable thickened portions or the like in the region of the ends 4a.

Figure 3:
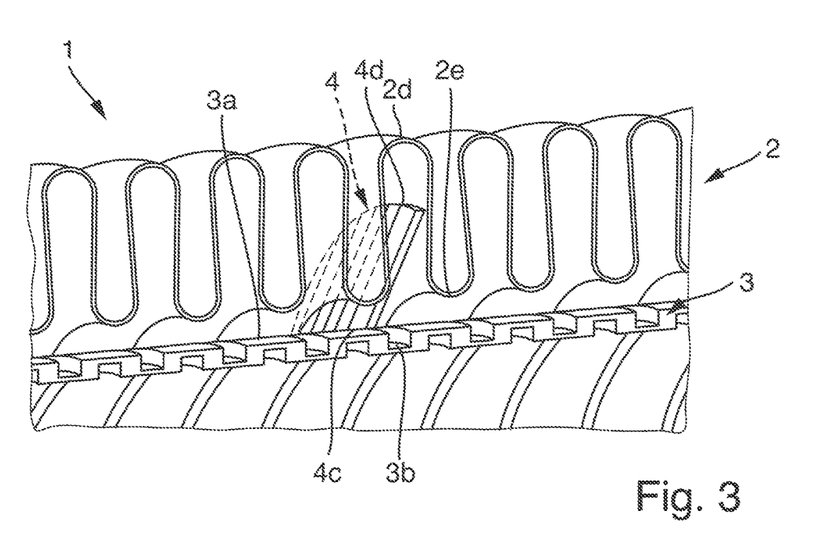
FIG. 3 shows another possible embodiment of a coupling element.

FIG. 3 shows another example of a possible embodiment of the coupling element or coupling elements 4. Here, the coupling element 4 does not have a round (circular) cross section but is more disk-shaped in design, wherein its inner edge 4c makes contact with the inner component 3 and its outer edge 4d makes contact with the bellows 2. Contact between the coupling element 4 and the bellows 2 does not occur precisely at the vertex of the outer border 2d but more in the flank region—at a clear distance from the inner border 2e of the bellows 2, however. The present invention and, in particular, the wording of the attached patent claims is expressly intended to cover such an embodiment.

The profiled embodiment of the outer surface 3a of the inner component 3 can be seen particularly clearly in FIG. 3. As an alternative to the embodiment shown in FIG. 3, in which the coupling element 4 makes contact with the inner component 3 in a region outside the profile gaps, an embodiment is also possible in which the coupling element 4—more specifically the inner edge 4c thereof—engages in such a profile gap 3b of the inner component. Such an embodiment also has the advantage that relatively precise axial positioning of the coupling element 4 is made possible.

Figure 4:
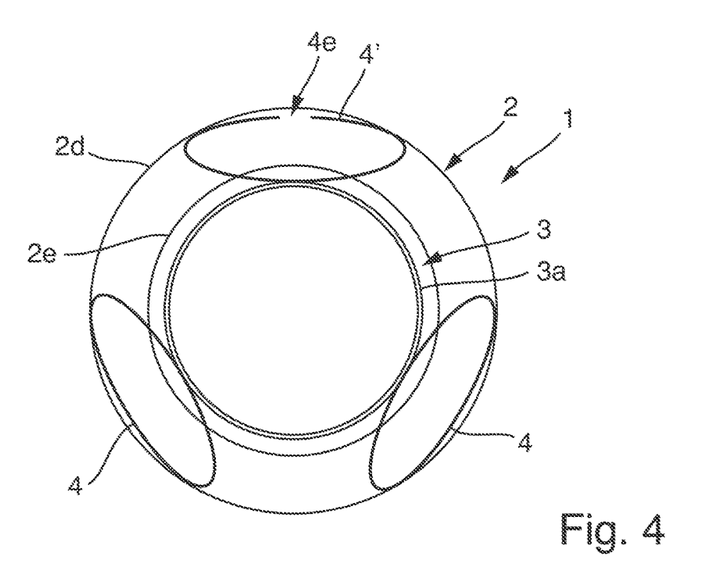
FIG. 4 shows a cross section through a line assembly according to the invention having further coupling elements designed in an alternative way.

FIG. 4 shows an arrangement of three coupling elements 4, 4', which are arranged so as to be distributed with a gap over the circumference of the bellows 2 and, in this case once again, make contact with the outer border 2d of the bellows 2 and the outer surface 3a of the inner component 3. The coupling elements 4 are in the form of continuous wire rings, while coupling elements 4' have a gap or interruption at reference sign 4e, thus, in particular, making installation of the coupling element 4' easier. Reference may be made at this point to the fact that, in principle, the installation of the coupling elements 4, 4' can be performed in such a way that they are introduced within the clear inside diameter of the bellows 2 in the region of the inner border 2e and then expanded into the region of the outer border 2d.

Figure 5:
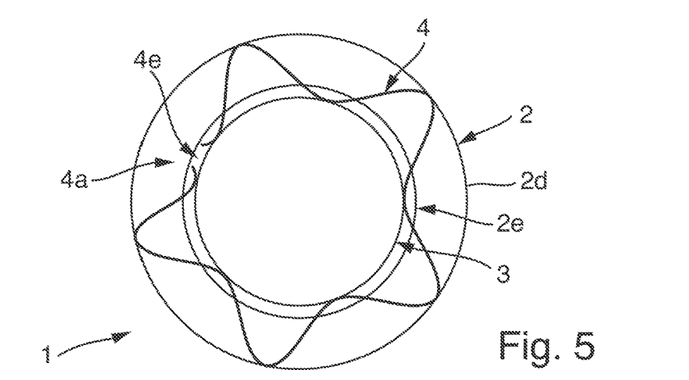
FIG. 5 shows a cross section through another line assembly according to the invention having a different coupling element.
Figure 6:
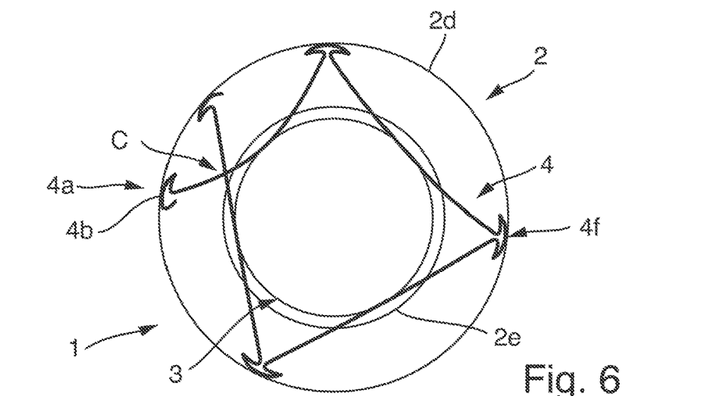
FIG. 6 shows a cross section through another line assembly according to the invention having a different coupling element.
Figure 7:
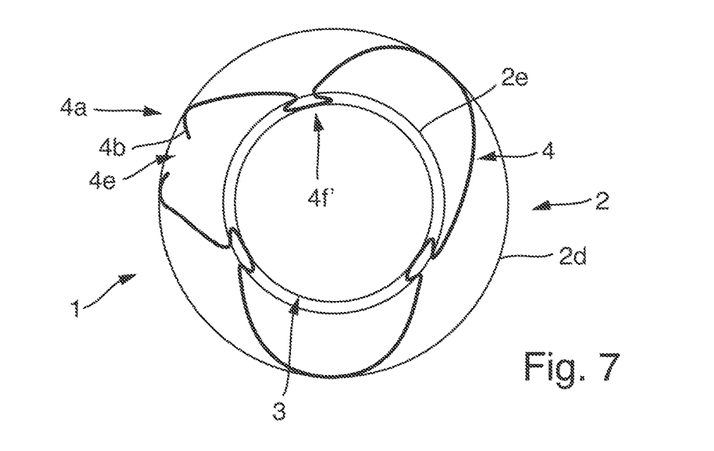
FIG. 7 shows a cross section through another line assembly according to the invention having a different coupling element.

FIGS. 5 to 7 show embodiments of coupling elements 4 which—in relation to a given axial position along the line assembly 1—are each of integral design, i.e. do not consist of a plurality of individual elements, as in the embodiments shown in FIGS. 1, 2 and 4.

According to FIG. 5, the coupling element 4 is of approximately star-shaped design with five "points" (there being no limit), each rounded at the tips. At reference sign 4e, the coupling element 4 has an opening. With the "points" mentioned, the coupling element 4 made contact with the bellows 2 in the region of the outer border 2d, while it rests on the inner component 3 at its locations of minimum inside diameter.

According to FIG. 6, the coupling element 4 is in the form of an open polygonal figure, wherein approximately mushroom-shaped structures 4f are formed at the corners, which ensure low-wear contact with the outer border 2d of the bellows 2. In the present case, there are three such structures 4f, while the coupling element 4 once again has bends 4b in the region of its ends 4a in order to reduce wear in the region of the outer border 2d of the bellows 2 in this case too.

In the regions between the structures 4f and 4b, the coupling element 4 rests on the inner component 3, corresponding approximately to the contact shown in FIG. 2.

At reference sign C, two segments of the coupling element 4 intersect. At this point C, corresponding (complementary) structures can be provided on the relevant segments of the coupling element 4 in order to prevent said segments from sliding past one another.

According to FIG. 7, mushroom-shaped contact structures 4f' similar to the structures 4f in FIG. 6 are formed in those segments of the coupling element 4 at which said element touches the inner component 3. In between, there are regions curved in the same direction as the outer border 2d of the bellows, by means of which the coupling element 4 touches the outer border 2d of the bellows 2. In the present case, three of said contact structures 4f' and, correspondingly, three contact regions with the outer border 2d of the bellows 2 are formed, wherein one of the last-mentioned contact regions is interrupted at reference sign 4e. The ends 4a formed there once again have bends 4b.

Figure 8:
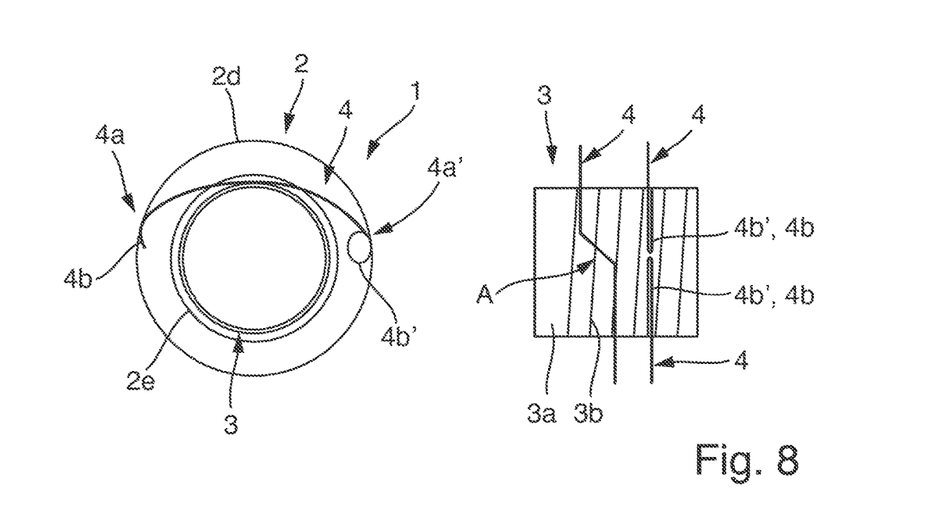
FIG. 8 shows another line assembly according to the invention having a coupling element in cross section and in a plan view.

In the left-hand part of the image, FIG. 8 shows a cross section through a line assembly 1 according to the invention having a single coupling element 4, which, in a manner similar to that in the embodiment shown in FIG. 1, extends over part of the circumference of the line assembly 1—in the present case approximately over half the circumference. A bend 4b is once again provided at one end 4a, while a loop or eye 4b' is formed at the other end 4a'—in particular in order in this way to form the end-located thickened portion, already mentioned several times, of the coupling element 4. As part of an alternative embodiment, it would also be possible for the thickened portion not to be arranged at the end.

In the right-hand part of FIG. 8, possible (axial) paths of the coupling element 4 are shown in a plan view. In particular, said element can have the axial offset shown at reference sign A in order selectively to bridge a profile gap 3b of the inner component 3 and to ensure contact substantially in the region of the outer surface 3a of the inner component. Moreover, an end-located joint of inner component 4 is shown in the region of loops or bends 4b', 4b, which is intended to prevent coupling elements 4 sliding past one another.

Figure 9:
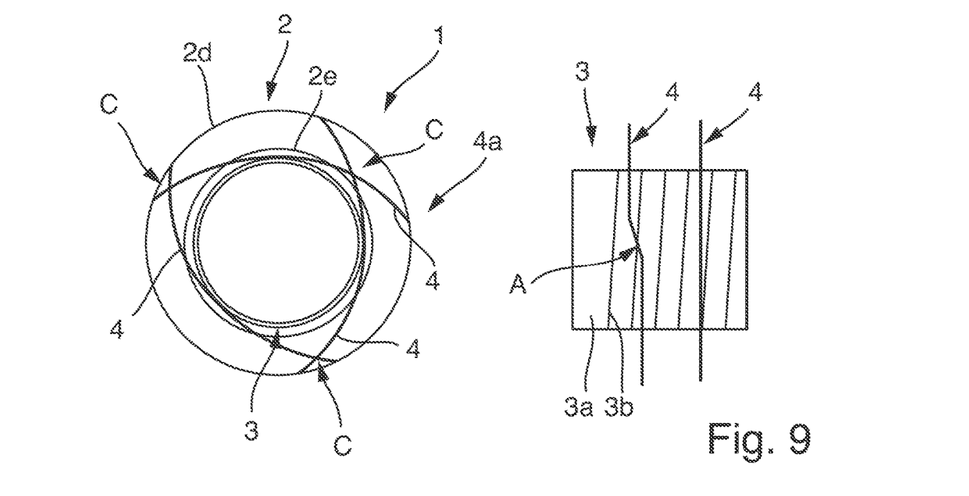
FIG. 9 shows another line assembly according to the invention having a number of coupling elements in cross section and in a plan view.

FIG. 9 shows, in two partial images, a different embodiment of the invention, the basic features of which correspond to the embodiment shown in FIG. 1. Here, however, there is an overlap between adjacent coupling elements 4 at certain points of intersection C distributed over the circumference. Attention has already been drawn thereto in connection with FIG. 6. The individual coupling elements 4 can have suitable structures in the region of the points of intersection C, said structures preventing the coupling elements 4 sliding past one another in an undefined manner.

In the right-hand part of FIG. 9, possible axial paths of the coupling elements 4 are once again shown in a plan view—once again with an axial offset (reference sign A) and without an axial offset.

Figure 10:
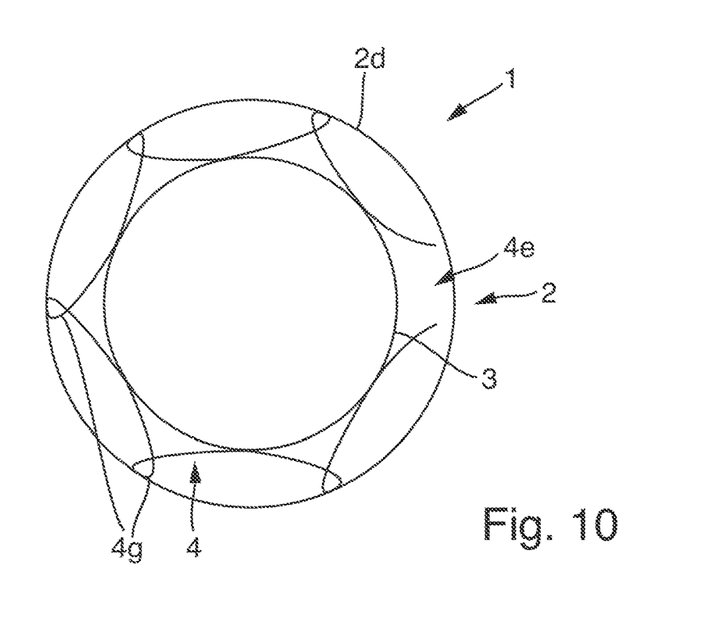
FIG. 10 shows another embodiment of the coupling element in a line assembly according to the invention.

FIG. 10 shows a single coupling element 4, which, in a manner similar to FIGS. 5 to 7, extends substantially over the full circumference of the line assembly 1 and is open at reference sign 4e. The embodiment according to FIG. 10 corresponds substantially to that according to FIG. 6—with the exception that loop-shaped contact structures 4g are formed at the outer contact points with the outer border 2d of the bellows 2.

Figure 11:
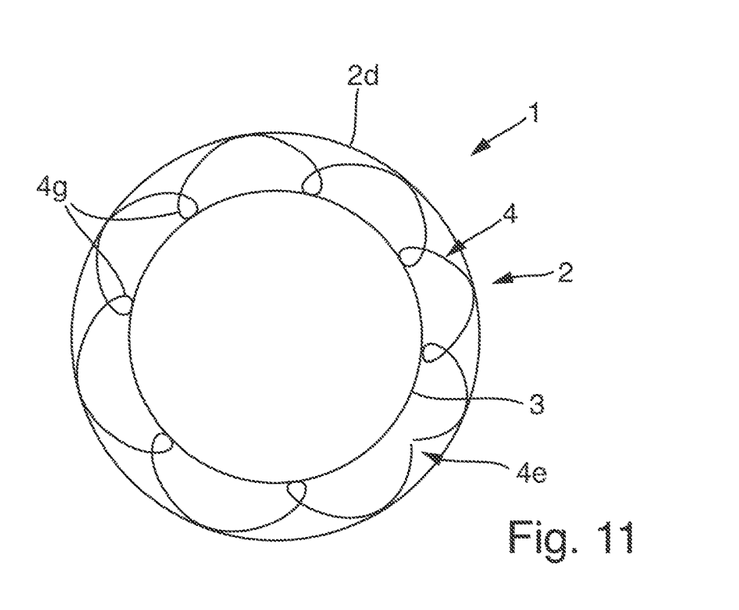
FIG. 11 shows yet another embodiment of the coupling element in a line assembly according to the invention.

In contrast, the embodiment according to FIG. 11 corresponds substantially to that in FIG. 7 because, in this case, the loop-shaped contact structures 4g are formed on the inside and ensure contact with the inner component 3.

Figure 12:
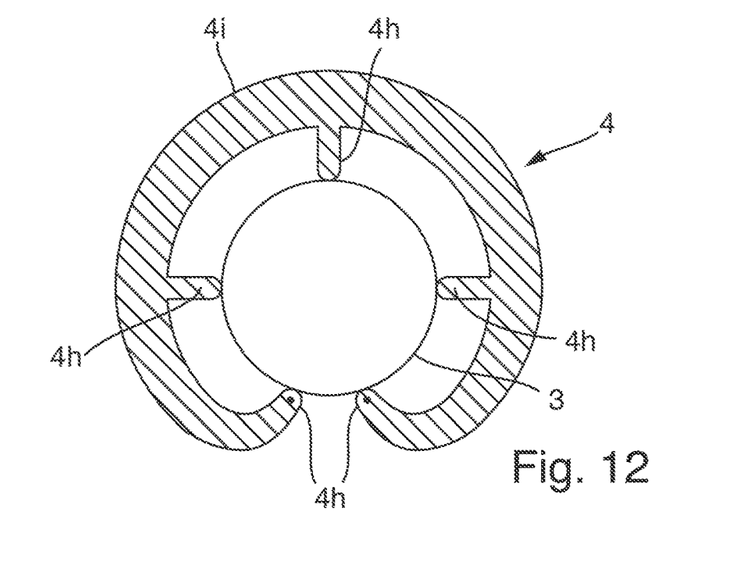
FIG. 12 shows another possible embodiment of the coupling element in a line assembly according to the invention.
Figure 13:
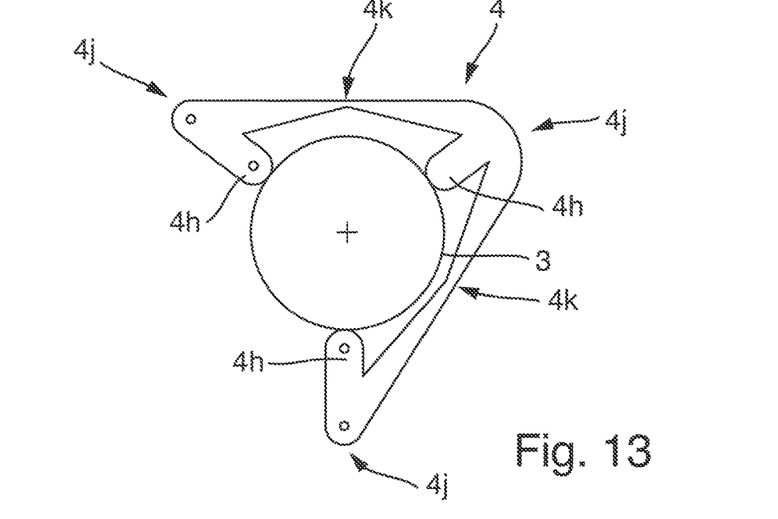
FIG. 13 shows another alternative embodiment of the coupling element in a line assembly according to the invention.

FIGS. 12 and 13, on the other hand, show relatively solid coupling elements 4, which can be designed as stampings made of sheet metal, for example, and which have a series of radial projections 4h distributed over the circumference thereof, by means of which they make contact with the inner component 3 of a line assembly (which in other respects is not shown). The coupling element 4, 4' can be a flexible sheet-metal part that is radially expandable.

The coupling element 4 according to FIG. 12 is in contact by means of its (substantially circular) outer circumferential surface 4i in the region of the outer border of a bellows (not shown). Installation is preferably accomplished—in particular before the introduction of the inner component 3—by suitable deformation, e.g. twisting, of the coupling element 4 shown.

At reference sign 4j, the coupling element 4 according to FIG. 13 has relatively solid regions, while it is of relatively thin and correspondingly easily deformable design in regions 4k. At reference sign 4j it is an externally rounded design in the region of the solid parts and, in this area, ensures contact with the outer border of a bellows (not shown). At the same time, the embodiment is not restricted to the substantially triangular shape shown by way of example. The thin parts at reference sign 4k provide the required possibility of installation, the coupling element first of all being compressed, e.g. until the end-located projections 4h touch, then being introduced into the relevant line assembly and expanded again there, after which the inner component 3 is introduced.

Figure 14:
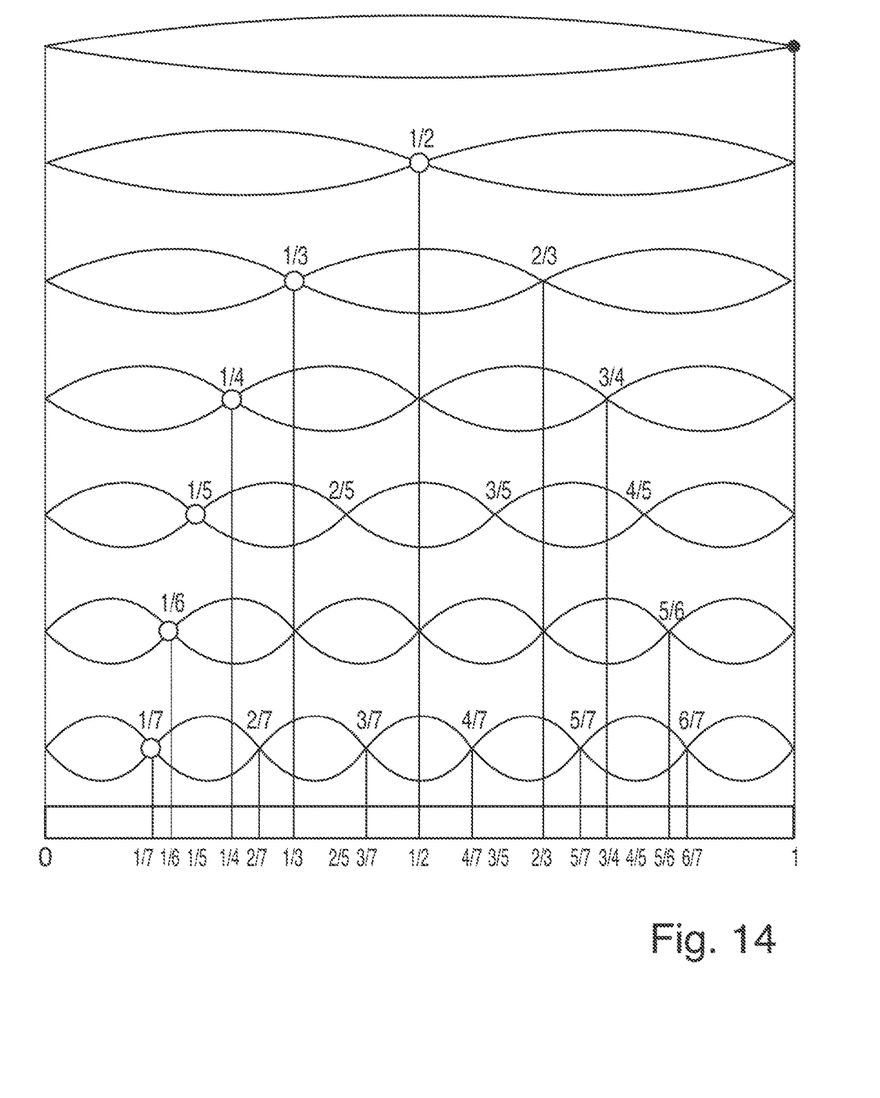
FIG. 14 schematically shows possible undamped vibration modes which can form in a line assembly which is not damped in accordance with the invention.

Finally, FIG. 14 shows schematically a fundamental frequency (at the top) and further vibration modes, i.e. the associated forms of vibration, of a higher order, or of the kind which can form in line assemblies of the type described here (without damping according to the invention). In the case of bars (longitudinal vibrations) of constant cross sections, the higher natural frequencies are integer multiples of the first natural frequency, and the vibration modes associated with higher natural frequencies have the appearance shown in idealized form in FIG. 14. In the case of bending vibrations (radial vibrations), the forms of vibration have a somewhat different appearance, and the higher natural frequencies no longer coincide with multiples of the first natural frequency. According to the invention, the damping of the bellows can now be improved by positioning at least one coupling element of the type shown but preferably a plurality of coupling elements where vibration anti-nodes could otherwise form. For the first natural mode (uppermost illustration in FIG. 14), this would be precisely the center of the component, for example. If a coupling element is arranged there, this form of vibration cannot form. The same applies to the higher-order natural modes if the position of the respective vibration anti-nodes is taken into account. By selectively positioning a plurality of coupling elements, it is possible in this way to prevent the formation of all forms of vibration relevant during operation if the depiction in FIG. 14 is used as a reference. In this case, a given coupling element can—depending on position—have a favorable, i.e. damping, effect on several natural modes.

In practice, such positioning of coupling elements can lead to the vibrating bellows being "divided up" into two or more unequal bellows modules with dissimilar vibration behavior. In this way, it is additionally possible to ensure that the vibrations of the individual bellows modules have a positive effect on each other through (destructive) phase displacement, i.e. ensure suppression of vibration formation.

In practice, a bellows or a line assembly will have certain preferential vibration frequencies (natural frequencies), depending on design embodiment, this being known per se to a person skilled in the art. The axial position of the coupling element or of the coupling elements should then be adapted depending on the bellows design (natural frequencies or natural modes) and in accordance with the expected excitation of the bellows in order to achieve selective, case-specific damping of the excited natural vibration mode of the bellows through selective axial positioning of the coupling element.

The invention claimed is:

1. A line assembly (1) for motor vehicle exhaust gas conduits, comprising:
   a metal hose (2), which is corrugated at least segmentally; and
   an inner component (3) having a profiled surface with profile gaps, the inner component being arranged radially inside of the metal hose, at least over a partial length of the metal hose;

at least one coupling element (4, 4') arranged between an outer border (2d) of the metal hose (2) and an outer surface (3a) of the inner component (3), said coupling element is designed to damp the metal hose (2) by mechanical coupling to the inner component (3), wherein the at least one coupling element (4, 4') makes contact with the outer border (2d) of the metal hose (2), on the one hand, and with the outer surface (3a) of the inner component (3), on the other hand, at least during operation of the line assembly (1); and the coupling element (4, 4') engages in the profile gaps (3b) of the inner component (3) and, at the same time, is matched to a pitch of said profile gaps (3b).

2. The line assembly (1) as claimed in claim 1, wherein the metal hose (2) is a bellows.

3. The line assembly (1) as claimed in claim 1, wherein the inner component (3) is a strip wound hose or liner.

4. The line assembly (1) as claimed in claim 1, wherein the coupling element (4, 4') touches at least one of the metal hose (2) or the inner component (3) at a number of contact points.

5. The line assembly (1) as claimed in claim 4, wherein the coupling element (4, 4') is rounded or to be bent round (4b) at the contact points.

6. The line assembly (1) as claimed in claim 1, wherein the coupling element (4, 4') is an element which extends substantially over at least a full circumference of at least one of the inner component (3) or of the metal hose (2).

7. The line assembly (1) as claimed in claim 1, wherein the coupling element (4, 4') is an element which extends only over part of a circumference of at least one of the inner component (3) or of the metal hose (2), and a plurality of said coupling elements (4, 4') are arranged in a manner distributed over a full circumference of at least one of the inner component (3) or the metal hose (2).

8. The line assembly (1) as claimed in claim 7, wherein the coupling element (4, 4') is a geometrical structure with at least a single interruption (4e) or is deformable in some other way to enable the coupling element (4, 4') to be inserted through a clear width of the metal hose (2) in a region of an inner border (2e) of said hose and then expanded into a region of an outer border (2d) of said hose.

9. The line assembly (1) as claimed in claim 1, wherein the coupling element (4, 4') is a flexible sheet-metal part that is radially expandable.

10. The line assembly (1) as claimed in claim 1, wherein the coupling element (4, 4') is a piece of wire.

11. The line assembly (1) as claimed in claim 1, wherein the coupling element (4, 4') has thickened portions, projections or a material thickness which are larger than half a width of the outer border (2d) during the operation of the line assembly (1).

12. The line assembly (1) as claimed in claim 1, wherein a material thickness of the coupling element (4, 4') is less than or equal to a width of profile gaps (3b) of the inner component.

13. The line assembly (1) as claimed in claim 1, wherein the at least one coupling element (4, 4') is held with a clamping action between the outer border (2d) of the metal hose (2) and the inner component (3).

14. The line assembly (1) as claimed in claim 1, wherein the at least one coupling element (4, 4') is connected materially at the contact points thereof with the metal hose (2) or with the inner component (3).

15. The line assembly (1) as claimed in claim 1, wherein the at least one coupling element (4, 4') has selective axial positioning relative to the metal hose (2) for damping certain vibrations of the line assembly (1), and the at least one coupling element (4, 4') is arranged substantially at a location or in the vicinity of a vibration anti-node of an undamped vibration mode of the metal hose (2) or of the overall assembly comprising the metal hose (2) and the inner component (3).

16. The line assembly (1) as claimed in claim 1, wherein a plurality of the coupling elements (4, 4') are provided at different positions along the line assembly (1) in order to suppress multiple vibration modes.

17. The line assembly (1) as claimed in claim 1, wherein subdivision of the metal hose (2) into two or more hose modules or hose segments is achieved by arranging a plurality of coupling elements (4, 4') at different positions along the line assembly (1).

18. The line assembly (1) as claimed in claim 17, wherein the subdivision of the metal hose (2) is chosen in such a way that the vibrations of the hose modules or hose segments influence one another, due to phase displacement.

19. The line assembly (1) as claimed in claim 1, wherein a position of the at least one coupling element (4, 4') is matched to a natural form or form of vibration or vibration mode of the metal hose (2) associated with a given vibration natural frequency, with the at least one coupling element (4, 4') arranged substantially at a location or in a vicinity of a vibration anti-node of an undamped vibration mode of the metal hose (2) or of the overall assembly comprising the metal hose (2) and the inner component (3).

20. The line assembly (1) as claimed in claim 1, wherein the metal hose (2) and the inner component (3) are spaced apart radially, with the exception of any attachment points in end-located connection regions of the line assembly (1) or with the exception of the position of the at least one coupling element (4, 4').

* * * * *